United States Patent
Schmitz et al.

(10) Patent No.: US 8,431,215 B2
(45) Date of Patent: *Apr. 30, 2013

(54) LABEL FILM FOR DEEP DRAWING METHODS

(75) Inventors: Bertram Schmitz, Sarreguemines (FR); Karl-Heinz Kochem, Neunkirchen (DE); Wilfrid Tews, Bechhofen (DE)

(73) Assignee: Treofan Germany GmbH & Co. KG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/786,870

(22) Filed: May 25, 2010

(65) Prior Publication Data

US 2010/0255287 A1  Oct. 7, 2010

Related U.S. Application Data

(63) Continuation of application No. 11/576,938, filed as application No. PCT/EP2005/010746 on Oct. 5, 2005, now Pat. No. 7,744,992.

(30) Foreign Application Priority Data

Oct. 7, 2004  (DE) .......................... 10 2004 048 811

(51) Int. Cl.
*B32B 5/22* (2006.01)
*B29C 45/14* (2006.01)

(52) U.S. Cl.
USPC .................. 428/317.9; 428/315.5; 428/315.7; 264/259; 264/509

(58) Field of Classification Search ............... 428/317.9, 428/71; 264/259, 509
See application file for complete search history.

(56) References Cited

U.S. PATENT DOCUMENTS

| 6,632,850 B2 | 10/2003 | Hughes et al. |
| 6,992,128 B2 | 1/2006 | Busch et al. |
| 7,144,542 B2 | 12/2006 | Holzer et al. |
| 2005/0212183 A1 | 9/2005 | Busch et al. |

FOREIGN PATENT DOCUMENTS

| DE | 3610644 | 10/1986 |
| DE | 4420989 | 12/1995 |
| DE | 4420991 A1 | 12/1995 |
| EP | 0557721 | 9/1993 |
| EP | 0865909 | 9/1998 |
| EP | 1369221 A1 | 12/2003 |
| JP | 62195030 | 8/1987 |
| WO | WO-99/55518 A1 | 11/1999 |
| WO | WO-02/45956 | 6/2002 |
| WO | WO-03/091316 A1 | 11/2003 |

OTHER PUBLICATIONS

Translation of JP 09-176352, Kuniaki Takada, "Production of Microporous Membrane," Jul. 8, 1997.

*Primary Examiner* — Hai Vo

(74) *Attorney, Agent, or Firm* — Novak Druce Connolly Bove + Quigg LLP

(57) ABSTRACT

The invention relates to the use of a biaxially oriented film having a porous layer, which contains propylene polymer and at least one β-nucleating agent and whose microporosity is generated by converting β-crystalline polypropylene during stretching of the film, for labeling containers during a drawing process.

14 Claims, 4 Drawing Sheets

LABEL FILM FOR DEEP DRAWING METHODS

RELATED APPLICATIONS

This application is a continuation application of U.S. patent application Ser. No. 11/576,938, filed Apr. 9, 2007 now U.S. Pat. No. 7,744,992, which is incorporated by reference in its entirety for all useful purposes, which is a national stage application (under 35 U.S.C. 371) of International Application No. PCT/EP2005/010746, filed Oct. 5, 2005, which claims the benefit of German application 10 2004 048 811.8, filed Oct. 7, 2004.

The present invention relates to the use of a biaxially oriented polypropylene film as an in-mold label in deep drawing.

Label films comprise an extensive and technically complex field. One differentiates between different label technologies, which basically vary in regard to the process conditions and necessarily have different technical requirements for the label materials. All labeling processes share the feature that visually appealing labeled containers must result as the final product, in which good adhesion to the labeled container must be ensured.

Greatly varying techniques are used for applying the label in the labeling methods. One differentiates between self-adhesive labels, wraparound labels, shrink labels, in-mold labels, patch labels, etc. The use of a film made of thermoplastic as a label is possible in all of these various labeling methods.

Various technologies are also differentiated for in-mold labeling, in which various method conditions are applied. All in-mold labeling methods share the feature that the label participates in the actual molding method of the container and is applied during this method. However, greatly varying molding methods are used for this purpose, such as injection molding methods, blowmolding methods, and deep-drawing methods.

In the injection molding method, a label is laid in the injection mold and a molten plastic is injected behind it. The label bonds to the injection-molded part due to the high temperatures and pressures and becomes an integral, nonremovable component of the molded part. For example, tubs and covers of ice cream or margarine tubs are produced according to this method.

For this purpose, individual labels are taken from a stack or cut to length from a roll and laid in the injection mold. The mold is designed in such a way that the melt flow is injected behind the label and the front side of the film presses against the wall of the injection mold. During the injection, the hot melt bonds to the label. After the injection, the mold opens, the molded part having the label is ejected and cools. In the product, the label must adhere to the container without wrinkles and in a visually perfect way.

During the injection, the injection pressure is in a range from 300 to 600 bar. The plastics used have a melt-flow index of approximately 40 g/10 minutes. The injection temperatures are a function of the plastic used. In many cases, the mold is additionally cooled to avoid sticking of the molded part to the mold.

In deep drawing, unoriented thick plastic slabs, usually cast PP or PS (polystyrene) at a thickness of approximately 200 μm, are heated and drawn or pressed using vacuum or ram tools in a corresponding mold. The individual label is also inserted into the mold and bonds during the molding process to the actual container in this case. Significantly lower temperatures are applied, so that the adhesion of the label to the container may be a critical factor. Good adhesion must be ensured even at these low processing temperatures. The processing speeds of this method are lower than in injection molding.

Direct in-mold labeling is also possible in the blowmolding of containers or hollow bodies. In this method, a melt tube is extruded vertically downward through a tubular die. A vertically divided mold moves together and encloses the tube, which is pinched closed at the lower end. A blow pin is inserted at the upper end, by which the opening of the molded part is implemented. Air is supplied to the hot melt tube via the blow pin, so that it expands and presses against the inner walls of the mold. The label must bond to the viscous plastic of the melt tube in this case. The mold is subsequently opened and the residue is cut off at the molded opening. The molded and labeled container is ejected and cools.

In this blowmolding method, the pressure during inflation of the melt tube is approximately 4-15 bar and the temperatures are significantly lower than in injection molding. The plastic materials have a lower MFI than in injection molding in order to form a dimensionally stable melt tube and therefore behave differently during the cooling process than the low viscosity materials for injection molding.

In principle, films made of thermoplastics may also be used for labeling the containers during molding in deep drawing. For this purpose, the films must have a selected property profile to ensure that the label film and the deep-drawn molded body fit against one another without bubbles during the deep drawing and bond to one another.

The adhesion of the label to the container is frequently flawed, because comparatively lower temperatures and pressures are used in deep drawing than in injection molding or blowmolding methods. Furthermore, similarly to blowmolding, air inclusions arise between the label and the container, which impair the appearance of the labeled container and also the adhesion. Therefore, labels for deep drawing applications are equipped with special adhesion layers which ensure good adhesion to the container. Coextruded, low-sealing cover layers or special adhesive layers are used for this purpose.

A film of this type is described, for example, in WO 02/45956. The cover layer of this film has improved adhesive properties in relation to greatly varying materials. The cover layer contains a copolymer or terpolymer made of an olefin and unsaturated carboxylic acids or their esters as the main component. It is described that this film may also be used as a label in deep drawing because of the improved adhesion.

EP 0 865 909 describes the use of "microvoided" films for labels. The film contains a β-nucleating agent, by which an increased proportion of β-crystalline polypropylene is generated in the precursor film upon cooling of the melt film. Upon stretching of the precursor film, "microvoids" are generated. According to the description, the film has good printability.

WO 03/091316 describes the use of a biaxially oriented microporous film which contains a propylene polymer and at least one β-nucleating agent and whose microporosity is generated by converting β-crystalline polypropylene during stretching of the film. According to the description, this film may advantageously be used as a label in blowmolding.

The object of the present invention is to provide a label film which may be used in the deep-drawing method and which has good adhesion in relation to the container and does not have any air inclusions.

The object on which the present invention is based is achieved by the use of a biaxially oriented film having a microporous layer, which contains polypropylene and β-nucleating agent, and whose microporosity is generated by converting β-crystalline polypropylene during stretching of the film, for labeling containers in deep drawing.

It has been found that a film having a microporous layer may be used outstandingly in deep drawing as a label and no bubbles or air inclusions occur in the special method conditions of the deep-drawing method if this microporosity is generated indirectly by β-nucleating agents. These structures generated in this way differ significantly from those of typical vacuole-containing films.

A DETAILED DESCRIPTION OF THE INVENTION

Figure 2A:
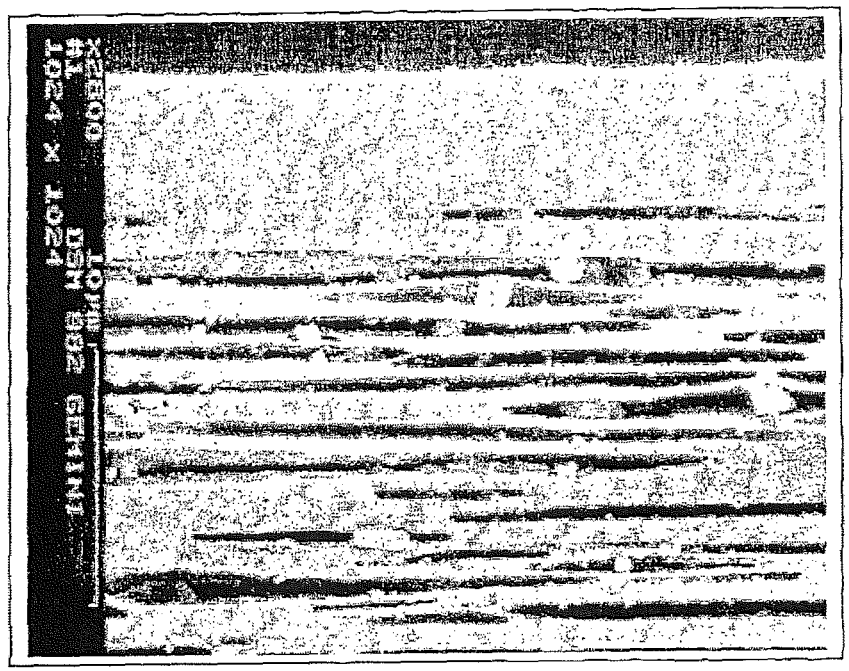
FIGS. 2a and 2b show the typical structure of a vacuole-containing layer made of thermoplastic polymer and incompatible fillers in cross-section (2a) and in a top view (2b).
Figure 2B:

FIGS. 2a and 2b show the typical structure of a vacuole-containing layer made of thermoplastic polymer and incompatible fillers in cross-section (2a) and in a top view (2b). Due to the incompatibility of the vacuole-initiating particles, cracks occur between the surface of the particle and the polymer matrix during stretching, and a closed, air-filled cavity arises, which is referred to as a vacuole. These vacuoles are distributed over the entire layer and reduce the density of the film, and/or the layer. These films still display a good barrier effect in relation to water vapor, for example, because the vacuoles are closed and the structure as a whole is not permeable.

Figure 1A:
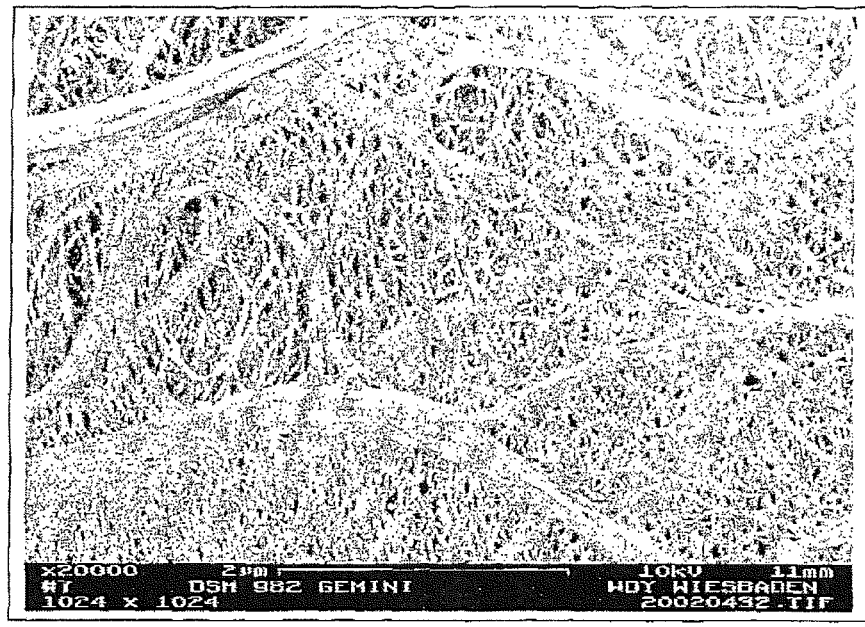
FIGS. 1a (top view) and 1b (cross-section) show the porous layer according to the present invention is gas-permeable and displays an open-pored network structure.

In contrast to this, the porous layer according to the present invention is gas-permeable and displays an open-pored network structure, as visible from FIGS. 1a (top view) and 1b (cross-section). This structure arises not due to incompatible fillers, but rather according to an entirely different technical method. The microporous layer contains polypropylene and β-nucleating agent. This mixture of polypropylene with β-nucleating agent is first melted in an extruder as usual in film production and extruded through a sheet die as a melt film onto a cooling roll. The β-nucleating agent encourages the crystallization of β-crystalline polypropylene during cooling of the melt film, so that an unstretched precursor film having a high proportion of β-crystalline polypropylene arises. The temperature and stretching conditions may be selected during the stretching of this precursor film in such a way that the β-crystallite converts into the more thermally stable alpha crystallite of the polypropylene.

Because the density of the β-crystallite is lower, this conversion is accompanied by volume shrinkage in this area, resulting in the characteristic porous structure in connection with the stretching process, similarly to a torn open network. The film externally appears white and opaque, even if it does not contain pigments or fillers.

Both methods are known per se in the prior art. Surprisingly, it has been found that a film having a porous layer does not have an orange peel effect or bubbling if it is used as a label film in deep-drawing methods and has surprisingly good adhesion in relation to the container. Opaque films having a vacuole-containing layer result in the undesired orange peel effect and bubbling as labels in deep-drawing methods. Surprisingly, the adhesion of the film having a microporous layer is significantly improved in relation to films made of polypropylene having a vacuole-containing structure. In particular, it is very surprising that the fibrillated special structure of the microporous layer has a positive influence on the adhesion strength during deep drawing. According to the current knowledge of those skilled in the art, adhesion is primarily determined by the properties of the polymers of the layer which is in contact with the container, for example, a lower melting point or a modification of the polymers contributes to improved adhesion.

The composition of the microporous layer, also referred to as a layer in the following, will now be described in greater detail. The microporous layer contains a propylene homopolymer and/or a propylene block copolymer, possibly additionally other polyolefins, and at least one β-nucleating agent, as well as possibly additional typical additives, such as stabilizers, neutralization agents, lubricants, antistatic agents, and pigments in the particular effective quantities. In general, additional incompatible vacuole-initiating fillers such as calcium carbonate or polyesters, like PET or PBT, are dispensed with, so that the layer generally contains less than 5 weight-percent, preferably 0 to at most 1 weight-percent, of these vacuole-initiating fillers. Small quantities of this type may reach the layer via the incorporation of reclaimed film.

In general, the microporous layer contains at least 70→100 weight-percent, preferably 80 to 99.95 weight-percent, in particular 90 to 97 weight-percent of a propylene homopolymer and/or propylene block copolymer and 0.001 to 5 weight-percent, preferably 0.1 to 3 weight-percent, of at least one β-nucleating agent, each in relation to the weight of the layer (the remainder is other polyolefins and/or the cited additives).

Suitable propylene homopolymers contain 80 to 100 weight-percent, preferably 90 to 100 weight-percent propylene units and have a melting point of 140° C. or higher, preferably 150 to 170° C., and generally a melt-flow index of 0.5 to 10 g/10 minutes, preferably 2 to 8 g/10 minutes, at 230° C. and a force of 2.16 kg (DIN 53735). Isotactic propylene homopolymers having an atactic component of 15 weight-percent or less represent preferred propylene polymers for the layer, isotactic propylene homopolymer being especially preferred.

Suitable propylene block copolymers contain predominantly, i.e., more than 50 weight-percent, preferably 70 to 99 weight-percent, in particular 90 to 99 weight-percent propylene units. Suitable comonomers in corresponding quantities are ethylene, butylene, or higher alkene homologs, among which ethylene is preferred. The melt-flow index of the block copolymers is in a range from 1 to 15 g/10 minutes, preferably 2 to 10 g/10 minutes. The melting point is above 140° C., preferably in a range from 150 to 165° C.

The specified weight percentages relate to the particular polymer.

Mixtures made of propylene homopolymer and propylene block copolymer contain these two components in arbitrary mixture ratios. The ratio of propylene homopolymer to propylene block copolymer is preferably in a range from 10 to 90 weight-percent to 90 to 10 weight-percent, preferably 20 to 70 weight-percent to 70 to 20 weight-percent. Mixtures of this type made of homopolymer and block copolymer are especially preferred and improve the appearance of the microporous layer.

If necessary, the porous layer may contain other polyolefins in addition to the propylene homopolymers and/or propylene block copolymers. The proportion of these other polyolefins is generally less than 30 weight-percent, preferably in a range from 1 to 20 weight-percent. Other polyolefins are, for example, random copolymers of ethylene and propylene having an ethylene content of 20 weight-percent or less, random copolymers or propylene with $C_4$-$C_8$ olefins having an olefinic content of 20 weight-percent or less, terpolymers of propylene, ethylene, and butylene having an ethylene content of 10 weight-percent or less and having a butylene content of 15 weight-percent or less, or polyethylenes, such as HDPE, LDPE, VLDPE, MDPE, and LLDPE.

In principle, all known additives which encourage the formation of β-crystals upon the cooling of a polypropylene melt are suitable as the β-nucleating agent for the microporous layer. β-nucleating agents of this type, and also their mode of operation in a polypropylene matrix, are known per se in the prior art and are described in detail in the following.

Various crystalline phases of polypropylenes are known. During the cooling of a melt, the α-crystalline PP predominantly forms, whose melting point is approximately 158-162° C. A small component of β-crystalline phase may be generated during cooling by a specific temperature control, which has a significantly lower melting point, at 148-150° C., than the monocline α-modification. Additives are known in the prior art which result in increased proportion of the β-during crystallization of the polypropylene, such as γ-quinacridone, dihydroquinacridine, or calcium salts of phthalic acid.

For the purposes of the present invention, highly active β-nucleating agents are preferably used in the porous layer, which generate a β-proportion of 30-900, preferably 50-800, upon cooling of the melt film. A two-component nucleation system made of calcium carbonate and organic dicarboxylic acids is suitable for this purpose, for example, which is described in DE 3610644, to which reference is hereby expressly made. Calcium salts of dicarboxylic acids are especially advantageous, such as calcium pimelate or calcium suberate, as described in DE 4420989, to which reference is also expressly made. The dicarboxamides described in EP-0557721, in particular N,N-dicyclohexyl-2,6-naphthalene dicarboxamides, are also suitable β-nucleating agents.

In addition to the nucleating agents, maintaining a specific temperature range and the dwell time of the melt film at these temperatures as the extruded melt film is drawn off are important for achieving a high proportion of β-crystalline polypropylene in the precursor film. The extruded melt film is preferably cooled at a temperature of 60 to 130° C., in particular 80 to 120° C. Slow cooling also encourages the growth of the β-crystallite, therefore, the drawing-off speed, i.e., the speed at which the melt film runs over the first cooling roll, is to be slow. For a given configuration of drawing-off rolls, it may be ensured via the drawing-off speed that the film cools slowly to the particular temperature, and/or is held at this temperature for a sufficiently long time. In general, dwell times of 10 seconds to several minutes are possible. Longer dwell times of over 3 minutes are technically possible and increase the β-crystalline proportion in a way advantageous per se, but the production process becomes very slow and thus uneconomical using a process control of this type. Therefore, the dwell time is preferably 15 to 120 seconds. The drawing-off speed is preferably less than 25 m/minute, in particular 1 to 20 m/minute. The higher the achieved proportion of β-crystals in the precursor film, the simpler it is to achieve the net-like porous structure by stretching, in general, with uniform method conditions, greater porosities are achieved the higher the β-proportion in the precursor film.

Especially preferred embodiments contain 0.001 to 5 weight-percent, preferably 0.05 to 0.5 weight-percent, in particular 0.1 to 0.3 weight-percent calcium pimelate or calcium suberate in the microporous layer made of propylene polymer.

In general, the microporous label film is single-layered and only comprises the microporous layer. However, it is obvious that this single-layered film may possibly be provided with a printing or a coating before it is used as a label film in deep drawing. Of course, the surface of the porous layer is in contact with the container and the printing or coating forms the exterior of the label with multilayer films of this type. For such single-layered embodiments, the thickness of the film, i.e., the porous layer, is in a range from 20 to 150 μm, preferably 30 to 100 μm.

The microporous layer may possibly be provided on the exterior with a corona, flame, or plasma treatment to improve the adhesion in relation to printing inks or coatings.

The density of the microporous layer is generally in a range from 0.2 to 0.80 g/cm³, preferably 0.3 to 0.65 g/cm³, a density of less than 0.6 g/cm³ being preferred. Surprisingly, it has been found that an especially low density does not result in an increase of the orange peel effect, as in vacuole-containing, opaque films. Relevant publications teach, in regard to vacuole-containing, opaque films, that too low a density due to voiding which is too strong results in an increased orange peel effect. Surprisingly, this is not the case for porous films. The density may be reduced to extremely low values of less than 0.5 g/cm³ and the film may nonetheless be applied perfectly in deep drawing without a disturbing orange peel effect occurring.

In a further embodiment, the microporous layer may be provided with a further cover layer, the microporous layer facing toward the container in the use according to the present invention of this multilayered embodiment and bonding to the molded body during deep drawing. Accordingly, the additional cover layer forms the exterior of the label. The additional cover layer may be applied by laminating the porous layer with a further film. It is preferably a coextruded cover layer. In these multilayered embodiments, the thickness of the microporous layer is at least 20 μm, the thickness of the porous layer is preferably in a range from 25 to 100 μm, in particular 30 to 50 μm. The thickness of this cover layer is generally in a range from 0.5-5 μm, preferably 1-3 μm.

The possibly coextruded cover layer generally contains at least 70 weight-percent, preferably 75 to <100 weight-percent, particularly 90 to 98 weight-percent of a polyolefin, preferably a propylene polymer and possibly further typical additives such as neutralization agents, stabilizers, antistatic agents, lubricants, e.g., fatty acid amides or siloxanes or antiblocking agents in the particular effective quantities.

The propylene polymer of the cover layer is, for example, a propylene homopolymer, as already described above for the porous layer, or a copolymer made of propylene and ethylene or propylene and butylene or propylene and another olefin having 5 to 10 carbon atoms. For the purposes of the present invention, terpolymers of ethylene and propylene and butylene or ethylene and propylene and another olefin having 5 to 10 carbon atoms are also suitable for the cover layer. Furthermore, mixtures or blends made of two or more of the cited copolymers and terpolymers may be used.

Random ethylene-propylene copolymers and ethylene-propylene-butylene terpolymers are preferred for the cover layer, in particular random ethylene-propylene copolymers having an ethylene content of 2 to 10 weight-percent, preferably 5 to 8 weight-percent, or random ethylene-propylene-butylene-1 terpolymers having an ethylene content of 1 to 10 weight-percent, preferably 2 to 6 weight-percent and a butylene-1 content of 3 to 20 weight-percent, preferably 8 to 10 weight-percent, each in relation to the weight of the copolymer or terpolymer.

The random copolymers and terpolymers described above generally have a melt-flow index of 1.5 to 30 g/10 minutes, preferably 3 to 15 g/10 minutes. The melting point is in the range from 105° C. to 140° C. The blends made of copolymers and terpolymers described above have a melt-flow index of 5 to 9 g/10 minutes and a melting point of 120 to 150° C. All melt-flow indices specified above were measured at 230° C. and a force of 2.16 kg (DIN 53735).

The surface of this cover layer may possibly be provided with a corona, flame, or plasma treatment to improve the printability. The density of the film is only insignificantly increased by the nonporous cover layer, which also does not contain any vacuoles, in relation to single-layered embodiments and is therefore also in a range from 0.25 to 0.8 g/cm$^3$, preferably 0.25 to 0.6 g/cm$^3$, in particular <0.5 g/cm$^3$ for these embodiments.

The cover layer may possibly additionally contain typical additives such as stabilizers, neutralization agents, antiblocking agents, lubricants, antistatic agents, etc., in the particular effective quantities.

The porous film for the use according to the present invention is preferably produced according to extrusion methods or coextrusion methods known per se.

In the scope of this method, the polypropylene, which is admixed with β-nucleating agent, is melted in an extruder and extruded through a sheet die onto a drawing-off roll, on which the melt solidifies while forming the β-crystallite. In the case of the two-layered embodiment, the corresponding coextrusion is performed together with the cover layer. The cooling temperatures and cooling times are selected in such a way that the highest possible proportion of β-crystalline polypropylene arises in the precursor film. This precursor film having a high proportion of β-crystalline polypropylene is subsequently biaxially stretched in such a way that a conversion of the β-crystallite into alpha polypropylene and a delimitation of the network structure occurs during the stretching. The biaxially stretched film is subsequently thermally fixed and possibly corona, plasma, or flame treated on a surface.

The biaxial stretching (orienting) is generally performed sequentially, the stretching preferably first being performed longitudinally (in the machine direction) and then transversely (perpendicular to the machine direction).

The drawing-off roll or rolls are kept at a temperature of 60 to 130° C., preferably 80 to 120° C., to encourage the formation of a high proportion of β-crystalline polypropylene.

During the stretching in the longitudinal direction, the temperature is less than 140° C., preferably 90 to 125° C. The stretching ratio is in a range from 2:1 to 5:1. The stretching in the transverse direction is performed at a temperature of greater than 140° C., preferably at 145 to 160° C. The transverse stretching ratio is in a range from 3:1 to 6:1.

The longitudinal stretching is expediently performed with the aid of two rolls running at different speeds corresponding to the desired stretching ratio and the transverse stretching is performed with the aid of a corresponding tenting frame.

The biaxial stretching of the film is generally followed by its thermal fixing (heat treatment), the film being held approximately 0.5 to 10 seconds long at a temperature of 110 to 150° C. The film is subsequently wound up in a typical way using a winding unit.

Preferably, as noted above, a surface of the film is typically corona, plasma, or flame treated according to one of the known methods after the biaxial stretching.

For the alternative corona treatment, the film is guided between two conductor elements used as electrodes, such a high voltage, usually AC voltage (approximately 10,000 V and 10,000 Hz) being applied between the electrodes that spray or corona discharges may occur. The air above the film surface is ionized by the spray or corona discharge and reacts with the molecules of the film surface so that polar intercalations arise in the essentially nonpolar polymer matrix. The treatment intensities are in the typical scope, 38 to 45 mN/m being preferred.

Figure 1B:
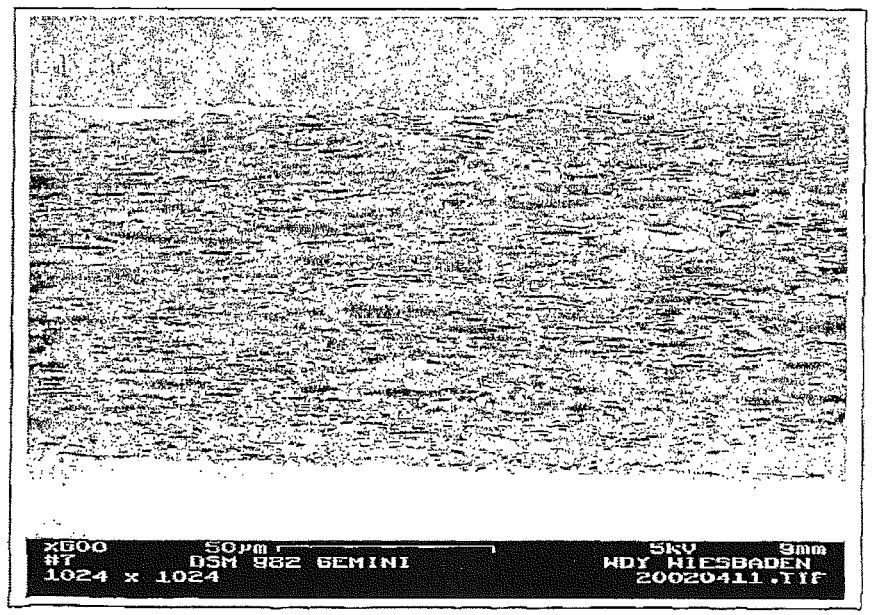

A film having a porous layer is obtained according to this method. The film is distinguished overall by a white or opaque appearance. The porous layer has a net-like structure (see FIGS. 1a and 1b), which is permeable to gases. The gas permeability of the porous layer may be determined by the Gurley value, for example, which indicates how long the passage of 100 cm$^3$ of air takes through the single-layer film under defined conditions.

It has been found that higher gas permeabilities, i.e., accordingly lower Gurley values, are particularly advantageous in regard to bubbling and adhesion. Therefore, films which have a microporous layer having a Gurley value of >50 to 5000 seconds are preferred. Surprisingly, however, very good results have also been found using comparatively denser films in which the Gurley value is above 5000. It has been found that Gurley values may be up to 300,000 seconds and nonetheless the required good adhesion and freedom from bubbles may be achieved. It is surprising that films having comparatively lower permeabilities are equally well suitable, because the good adhesion and freedom from bubbles was originally attributed to good ventilation through the porous structure of the layer. It was thus to be expected that a film having lower gas permeabilities of >5000 Gurley would be less suitable for the deep drawing application. Surprisingly, this is not the case.

Therefore, embodiments having Gurley values of the porous layer of >5000 to 300,000 Gurley, preferably 8000 to 250,000 Gurley are also preferred. These embodiments may be produced at higher production speeds and therefore have significant economic advantages in relation to the highly permeable embodiments. In particular, the cooling times on the drawing-off roll may be shortened here, by which the production speeds may be significantly increased.

According to the present invention, the film is used as a label in deep drawing. In suitable deep-drawing methods, thick films made of thermoplastic polymers are plastically molded at elevated temperature under the effect of pneumatic forces or by the mechanical action of molds. The plastic molding using pneumatic forces may be performed by partial vacuum (deep drawing) or excess pressure, i.e., compressed air. Methods of this type are known in the prior art and are referred to in English as "thermoforming". The methods and their embodiments are described in detail, for example, in Rosato's Plastics Encyclopedia and Dictionary, pages 755 through 766, to which reference is hereby expressly made.

Plastic molding under the effect of pneumatic forces is performed, for example, using partial vacuum after the film to be deep drawn has typically been pre-shaped using a top ram. Before the actual deep drawing, the label film is laid in the mold body and the deep drawing film is laid over it in such a way that the mold body is sealed airtight. A partial vacuum or vacuum is applied to the mold body in a suitable way. Because of the pressure differential, a suction acts on the deep drawing film. A heating element is attached above the film surface and heats the film until it deforms in the direction of the mold body. Temperature and partial vacuum are selected in the process in such a way that the film presses in a formfitting way against the mold body having the inserted label and bonds to the label. After removal of the pressure differential and cooling, the labeled, deep-drawn container may be removed.

Figure 3:
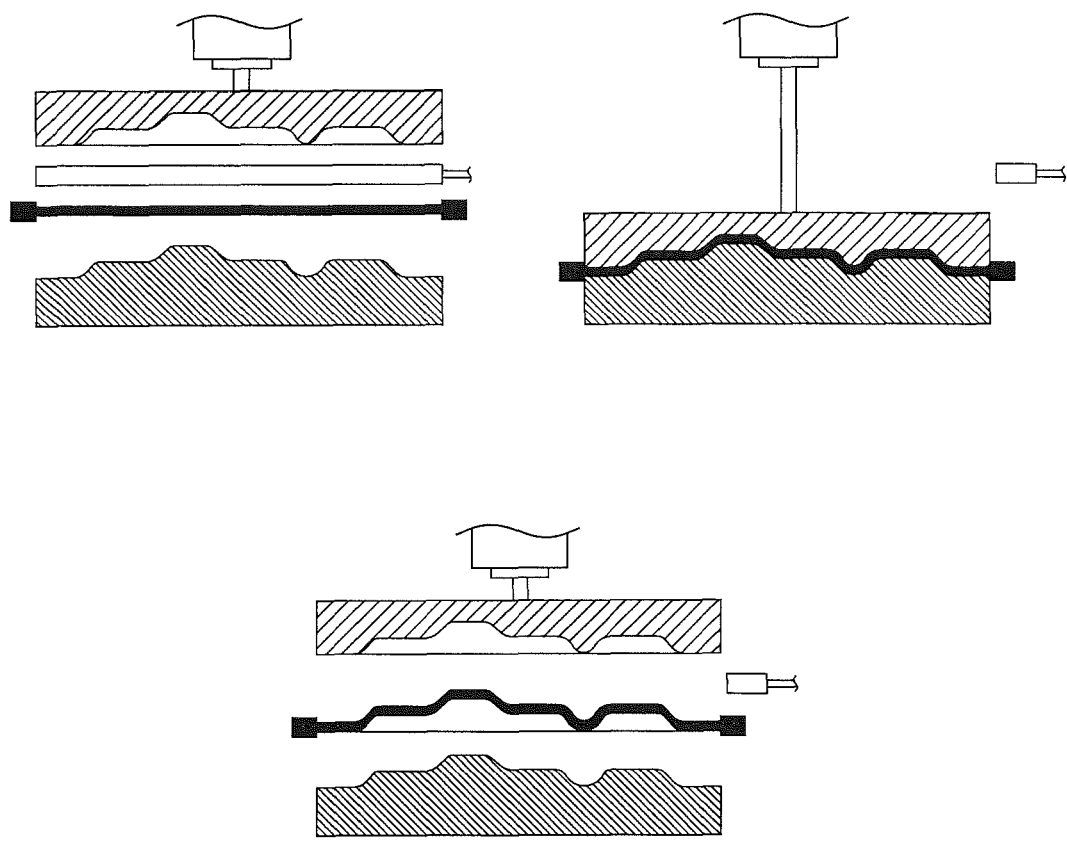
FIG. 3 shows various embodiments of the deep-drawing methods.
Figure 4:
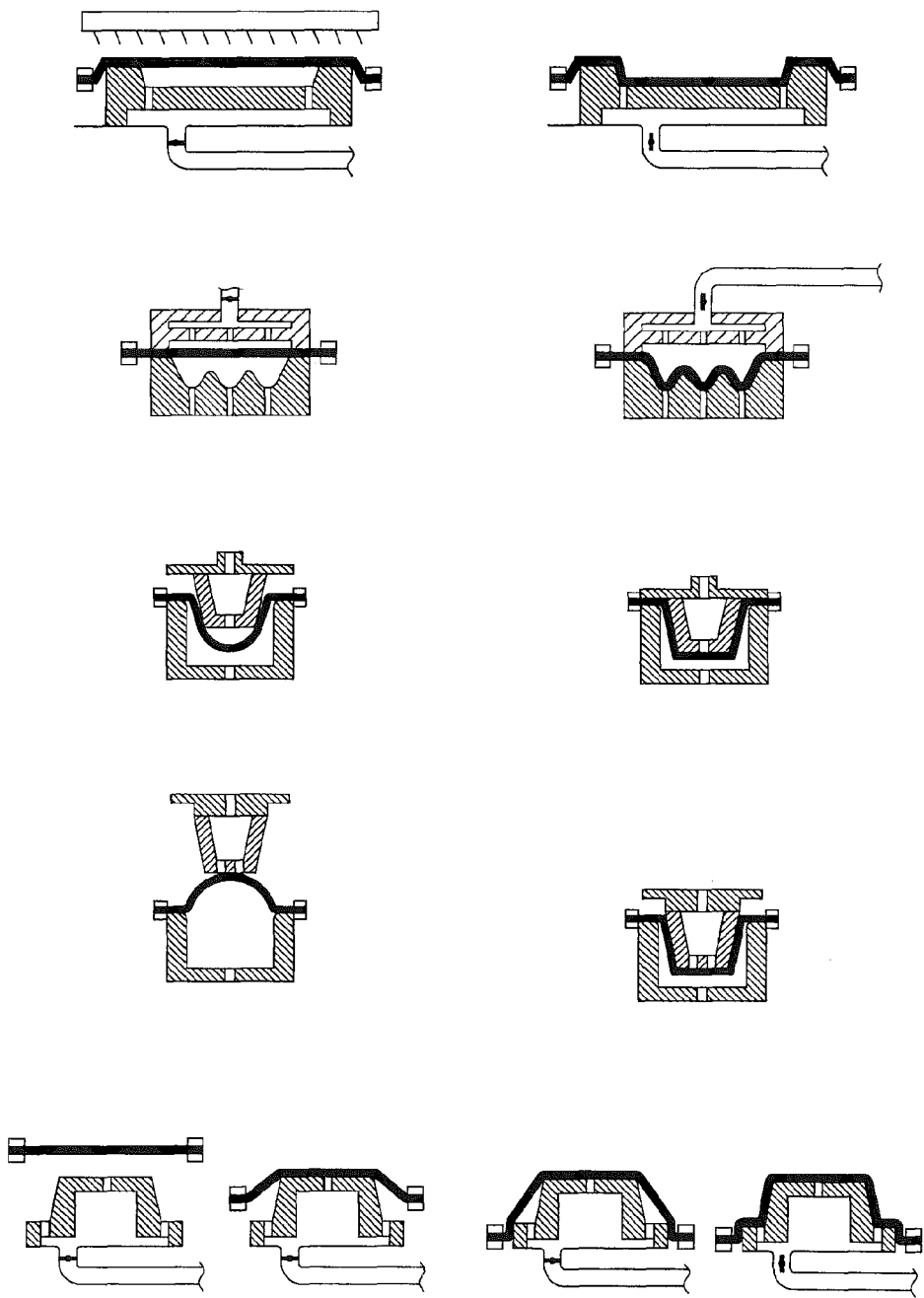
FIG. 4 shows the methods for deep drawing.

Various embodiments of the deep-drawing methods are shown as examples in FIG. 3 and schematically show devices for deep drawing. For the methods for deep drawing are illustrated in FIG. 4. In principle, any arbitrary suitable molds which may be evacuated and possibly molding tools may be used in deep drawing.

The following measurement methods were used for characterizing the raw materials and the films:

Melt-Flow Index

The melt-flow index of the propylene polymers was measured at 2.16 kg load and 230° C. according to DIN 53 735 and at 190° C. and 2.16 kg for polyethylenes.

Melting Points

DSC measurement, maxima of the melting curve, heating speed 20 K/minute.

β-Crystal Content

The DSC methods were used to determine the β-crystalline proportion (for example, in the precursor film) in polypropylene.

The characterization using DSC is described in J. o. Appl. Polymer Science, Vol. 74, pages: 2357-2368, 1999 by Varga and performed as follows: the sample having the β-nucleator added is first heated in the DSC at a heating rate of 20° C./minute to 220° C. and melted (first heating). It is then cooled at a cooling rate of 10° C./minute to 100° C., before it is melted again at a heating rate of 10° C./minute (second heating). During the second heating, the degree of crystallinity $K_{\beta,DSC}$ is determined from the ratio of the melt enthalpies of the β-crystalline phase ($H_\beta$) to the sum of the melt enthalpies of β- and α-crystalline phases ($H_\beta+H_\alpha$).

Density

The density is determined in accordance with DIN 53 479, method A.

Porosity

The porosity is calculated from the densities of the non-voided PP ($\delta_{PP}$) and the density of the voided PP ($\delta_{PPV}$), as follows:

$$\text{Porosity}[\%]=100*(1-[\delta_{PPV}/\delta_{PP}])$$

Permeability (Gurley Value)

The permeability of the label films was measured using the Gurley tester 4110, in accordance with ASTM D 726-58. The time which 100 cm³ of air required to permeate through the label area of 1 in.² (6.452 cm²) was determined. The pressure differential over the film corresponds to the pressure of a water column of 12.4 cm in height. The time required then corresponds to the Gurley value.

The present invention will now be explained by the following examples.

Example 1

A single layer film was extruded from a sheet die at an extrusion temperature of 245° C. according to the extrusion method. The film had the following composition:
  approximately 50 weight-percent propylene homopolymer (PP) having an n-heptane soluble proportion of 4.5 weight-percent (in relation to 100% PP) and a melting point of 165° C.; and a melt-flow index of 3.2 g/10 minutes at 230° C. and 2.16 kg load (DIN 53 735) and
  approximately 49.9 weight-percent propylene-ethylene block copolymer having an ethylene proportion of approximately 5 weight-percent in relation to the block copolymer and an MFI (230° C. and 2.16 kg) of 6 g/10 minutes
  0.1 weight-percent calcium pimelate as a β-nucleating agent The film contained additional stabilizers and neutralization agents in typical quantities.

The molten polymer mixture was drawn off after the extrusion via a first drawing-off roll and a further roll trio and solidified, subsequently longitudinally stretched, transversely stretched, and fixed, the following specific conditions having been selected:
  extrusion: extrusion temperature 245° C.
  cooling roll: temperature 125° C.
  drawing-off speed: 1.5 m/minute (dwell time on the drawing-off roll: 55 seconds)
  longitudinal stretching: stretching roll T=90° C.
  longitudinal stretching by a factor of 4
  transverse stretching: heating panels T=145° C.
  stretching panels T=145° C.
  transverse stretching by a factor of 4

The porous film thus produced was approximately 80 μm thick and had a density of 0.35 g/cm³ and displayed a uniform white-opaque appearance. The porosity was 560 and the Gurley value was 1040 seconds.

Example 2

A film was described as produced in Example 1. In contrast to Example 1, 0.3 weight-percent, in relation to the weight of the layer, of a dicarboxamide was now used as the β-nucleating agent. The porous film thus produced was approximately 70 μm thick and had a density of 0.40 g/cm³ and displayed a uniform white-opaque appearance. The porosity was 51% and the Gurley value was 1200 seconds.

Example 3

A film was produced as described in Example 1. The composition was not changed. In contrast to Example 1, a higher drawing-off speed was selected in the production: 3 m/minute (dwell time on the drawing-off roll: 27 seconds) and a drawing-off temperature of 120° C. was set. The porous film thus produced was approximately 60 μm thick and had a density of 0.5 g/cm³ and displayed a uniform white-opaque appearance. The porosity was 41% and the Gurley value was 36,000 seconds.

Example 4

A film was produced as described in Example 1. The composition was not changed. In contrast to Example 1, a higher drawing-off speed was selected of 5 m/minute (dwell time on the drawing-off roll: 17 seconds) and a drawing-off temperature of 115° C. was set in the production. The porous film thus produced was approximately 90 μm thick and had a density of 0.5 g/cm³ and displayed a uniform white-opaque appearance. The porosity was 42% and the Gurley value was 170,000 seconds.

Comparative Example 1

An opaque three-layer film having a layer structure ABC having a total thickness of 80 μm was produced by coextrusion and subsequent step-by-step orientation in the longitudinal and transverse directions. The cover layers each had a thickness of 0.6 μm.

Base layer B (=vacuole-containing layer):
93 weight-percent propylene homopolymer having a melting point of 165° C.
7.0 weight-percent $CaCO_3$ of the Millicarb type having a mean diameter of 3 μm Cover layer A
  99.67 weight-percent random ethylene-propylene copolymer having a $C_2$ content of 3.5 weight-percent
  0.33 weight-percent $SiO_2$ as an antiblocking agent having a mean diameter of 2 μm cover layer B like cover layer A The production conditions in the individual method steps were:

| | |
|---|---|
| extrusion temperatures | 280° C. |
| temperature of the drawing-off roll: | 30° C. |
| longitudinal stretching: temperature: | 122° C. |
| longitudinal stretching ratio: | 6.0 |
| transverse stretching: temperature: | 155° C. |
| transverse stretching ratio: | 8.0 |
| fixing: temperature: | 140° C. |
| convergence: | 15% |

In this way, an opaque, vacuole-containing film having a density of 0.6 g/cm³ was obtained. The film was not porous, a Gurley value therefore could not be determined for this film.

Use According to the Present Invention

The films according to the examples and the comparative example were used as label films in deep drawing a margarine tub. For this purpose, the labels were cut into cross shapes, the blanks were stacked and provided in a magazine to the deep drawing system. The deep drawing system was equipped with a top ram as a molding aid. The labels were removed from the magazine by suction and folded in such a way that the faces of the cross-shaped label covered the later side walls of the container. The folded label was laid in the mold, placed using an auxiliary core, and held by suction.

A 600 μm thick PP deep-drawing film was heated using IR radiators up into the range of its plastic deformability (>165° C.). By lowering the top ram and applying a vacuum through holes in the wall of the mold, the deep drawing film was deformed, so that it bonded with the inserted label.

The labeled container was checked in regard to adhesion and appearance. It was shown that the film of Comparative Example 1 had significant bubbling between film and container wall and thus impaired adhesion.

The microporous films according to Examples 1 through 4 displayed a homogeneous appearance of the label surface without bubbling or other visual flaws, as well as good adhesion of the label to the container surface. Surprisingly, the labeled containers did not differ in their visual quality, although the films according to Examples 3 and 4 had significantly lower gas permeabilities than typical porous films.

The invention claimed is:

1. A labeled container comprising
   a container, and
   a label which comprises a biaxially oriented film having a porous layer, which contains propylene polymer and at least one β-nucleating agent and whose microporosity is generated by converting β-crystalline polypropylene into alpha-crystalline polypropylene during stretching of the film, and
   wherein the label is applied to the container by a deep drawing process and the porous layer has a Gurley value in a range from 36,000 to 300,000 seconds.

2. The labeled container according to claim 1, wherein the porous layer has a Gurley value in a range from 36,000 to 250,000 seconds.

3. The labeled container according to claim 1, wherein the density of the film is in a range from 0.2 to 0.80 g/cm³.

4. The labeled container according to claim 1, wherein the microporous layer contains a propylene homopolymer and/or a propylene block copolymer.

5. The labeled container according to claim 1, wherein the microporous layer contains a mixture of propylene homopolymer and propylene block copolymer and the ratio is in a range from 90:10 to 10:90.

6. The labeled container according to claim 2, wherein the microporous layer contains a mixture of propylene homopolymer and propylene block copolymer and the ratio is in a range from 90:10 to 10:90.

7. The labeled container according to claim 1, wherein the microporous layer contains 0.001 weight-percent to 5 weight-percent β-nucleating agent in relation to the weight of the β-nucleated layer.

8. The labeled container according to claim 1, wherein the nucleating agent is a calcium salt of pimelic acid, suberic acid or a carboxamide.

9. The labeled container according to claim 1, wherein the microporous layer is provided with a cover layer on one side.

10. The labeled container according to claim 1, wherein the film is produced according to the tentering method and the drawing-off roll temperature is in a range from 60 to 130° C.

11. The labeled container according to claim 1, wherein the applied label applied to the container does not have an orange peel effect.

12. The labeled container as claimed in claim 1, wherein the label is applied to the container by a method comprises using deep drawing, in which a label which is cut to size is laid in a mold and a deep-drawable thick film is heated using heating elements to a temperature at which the polymer is thermoplastically deformable and subsequently the film is drawn into a mold using a molding tool or pneumatically, so that the film is tailored to the mold and a container is molded and simultaneously the inserted label is applied, wherein the label comprises a biaxially oriented film having a microporous layer, which has an open-pored, net-like structure, which was generated during the production of the film by converting β-crystalline polypropylene into alpha-crystalline polypropylene during the stretching, the microporous layer facing toward the container.

13. The labeled container according to claim 1, wherein a deep-drawable thick film is made of thermoplastic polymers which are plastically molded at elevated temperature under the effect of pneumatic forces or by the mechanical action of molds and the label displays a homogeneous appearance of the label surface without bubbling or other visual flaws, and a good adhesion of the label to the container surface.

14. A process for producing a labeled container according to claim 1 which comprises using deep drawing, in which a label which is cut to size is laid in a mold and a deep-drawable thick film is heated using heating elements to a temperature at which the polymer is thermoplastically deformable and subsequently the film is drawn into a mold using a molding tool or pneumatically, so that the film is tailored to the mold and a container is molded and simultaneously the inserted label is applied, wherein the label comprises a biaxially oriented film having a microporous layer, which contains propylene polymer and at least one β-nucleating agent, and which has an open-pored, net-like structure, which was generated during the production of the film by converting β-crystalline polypropylene into alpha-crystalline polypropylene during the stretching, the microporous layer facing toward the container.

* * * * *